United States Patent Office 3,225,094
Patented Dec. 21, 1965

3,225,094
PREPARATION OF POLYAMINES BY STEAM HYDROLYSIS OF POLYISOCYANATE REACTION PRODUCTS
Herbert Otto Wolf, Wilmington, Del., assignor to E. I. du Pont de Nemours and Company, Wilmington, Del., a corporation of Delaware
No Drawing. Filed June 15, 1962, Ser. No. 202,659
12 Claims. (Cl. 260—570)

This invention relates to a new hydrolysis process for recovering polyamines from polyisocyanate reaction products.

The term "polyisocyanate reaction products" as used in the specification and claims is meant to include only those products which can be formed by a reaction involving the isocyanato group (—NCO). The term therefore includes those compounds which can be derived from isocyanates although the actual manner in which the compound is obtained may have involved the use of other reactants. For example, the term is meant to include the polyurea of toluene diisocyanate, whether it be made from toluene diisocyanate and water or from phosgene and excess tolylenediamine. Likewise, the term is meant to include urethanes whether they are made by reaction of isocyanates with alcohol or by the reaction of chloroformates with amines. The term "polyisocyanate reaction products" is not meant to include compounds made from isocyanates by reactions which do not involve the —NCO group. For example, ring halogenated aromatic diisocyanates made by halogenation of aromatic diisocyanates may in one sense be considered isocyanate reaction products. However, halogenation of aromatic diisocyanates does not involve a reaction of the isocyanato group and thus ring halogenated aromatic diisocyanates are not meant to be included as "polyisocyanate reaction products" in this invention. It should be pointed out however, that compounds derived from ring halogenated aromatic diisocyanates such as ureas, methanes and trimers, which may be made through reactions involving the isocyanato groups, are meant to be included.

In the preferred and practical sense, the hydrolysis process of the present invention is to be applied to "polyisocyanate reaction products" which are in the form of residues or remnants. The residues result from, for example, the preparation of polyisocyanates by the phosgenation of polyamines which preparation is accompanied by the formation of tarry materials. Remnants occur, for instance, in the production of polyurethanes especially in such final forms as foams, fibers, and molded articles. These scrap materials and tarry residues contain some of the relatively expensive polyamine starting materials used in or as a part of the reaction in which "polyisocyanate reaction product" was first formed.

Hydrolysis is recognized as a means of recovering polyamines from polyisocyanate reaction products, such as phosgenation tars, polyurethane plastics and elastomers, including cellular polyurethane products. Most of these materials are quite resistant to hydrolysis and aqueous solutions of strong acids or bases have been required to effect hydrolysis at ordinary pressures and temperatures. The cost of reagents and the complications involved in separating the hydrolysis products from the reaction medium make hydrolysis processes using acidic or basic agents unattractive.

In an effort to avoid these problems, superatmospheric pressure hydrolysis processes have been developed for obtaining polyamines from phosgenation tars and polymeric urethanes. These processes involve treating said polyisocyanate reaction products with water in the liquid state at temperatures of about 160–250° C. and pressures ranging from 10–40 atmospheres. These processes avoid the problems associated with acidic or basic hydrolysis, but they require the use of costly high pressure equipment which restricts their usefulness.

Therefore, an object of this invention is to provide a process for the hydrolytic recovery of polyamines from polyisocyanate reaction products which process eliminates problems characteristic of previously known methods. A specific object of this invention is to provide a new process for obtaining polyamines by steam hydrolysis of polyisocyanate reaction products. Another particular object is to provide a novel process for hydrolyzing said reaction products to obtain polyamines, which process is operable at or near atmospheric pressure. A further particular object of this invention is to provide a process for steam hydrolysis of polyisocyanate reaction products, which products can be in different physical forms. Another specific object is to provide a process for promoting contact between steam and polyisocyanate reaction products to enhance the formation of polyamines therefrom. Other objects will appear hereinafter.

These and other objects are accomplished by the process which comprises contacting a non-volatile polyisocyanate reaction product with steam superheated to temperatures between 200–400° C.

By the process of this invention, polyamines can be obtained from phosgenation tars, urethane polymers, polyisocyanate dimers and trimers, and a wide variety of reaction products which can be made from polyisocyanates and active hydrogen compounds.

The process is restricted in that the material being subjected to hydrolysis must be essentially non-volatile under the conditions employed. A further restriction of the process requires that the material subjected to the hydrolysis not form intermediate hydrolysis products, short of the amine, which are volatile under the conditions employed. The term "non-volatile" used in this specification and claims is therefore intended to mean essentially non-volatile at the temperature of the steam employed in both situations, that is, the polyisocyanate reaction products and the intermediates formed therefrom upon contacting with superheated steam.

Hydrolysis is effected in this process by contacting polyisocyanate reaction products with superheated steam in the absence of condensed water.

The process can be conducted at atmospheric pressure or at a slightly elevated pressure. This permits the use of equipment of usual construction rather than high pressure equipment which is required by hydrolysis processes employing superheated water in the liquid state.

The isocyanate reaction products which can be hydrolyzed by the process of the present invention can be derived from aliphatic, cycloaliphatic, arylalkyl and aromatic polyisocyanates as long as the requirements for non-volatility are met. Representative examples of isocyanates which may form reaction products that are included are listed below:

Aliphatic diisocyanates:
    Tetramethylene diisocyanate
    Hexamethylene diisocyanate
Cycloaliphatic diisocyanates:
    Methylcyclohexane-2,4-diisocyanate
    4,4'-diisocyanatodicyclohexylmethane
Arylalkyl diisocyanates:
    m-xylylene diisocyanate
Aromatic diisocyanates:
    Toluene-2,4-diisocyanate
    Toluene-2,6-diisocyanate
    1,3-phenylene diisocyanate
    Cumene-2,4-diisocyanate Aromatic diisocyanates—Continued
- 4,4'-diisocyanatodiphenyl methane
- 4,4'-diisocyanatodiphenyl ether
- 1,5-naphthalene diisocyanate
- 4,4'-diisocyanatodiphenyl
- 3,3'-dimethyl-4,4'-diisocyanatodiphenyl methane
- 5-chlorotoluene-2,4-diisocyanate
- 4-chlorophenylene-1,3-diisocyanate
- 3,5-dichlorotoluene-2,4-diisocyanate Aromatic triisocyanates:
- Toluene-2,4,6-triisocyanate
- 4,4',4''-triisocyanatotriphenyl methane
- 2,4,4'-triisocyanatodiphenyl ether The process of the present invention finds its greatest use in the recovery of diamines from the reaction products of diisocyanates, because diisocyanates are commercially more important than triisocyanates. The non-volatility requirements of this process are in general met by isocyanate reaction products prepared from both diisocyanates and triisocyanates. In general, the isocyanate reaction products derived from monoisocyanates are too volatile to be hydrolyzed effectively by the process of this invention. The recovery of diamines from reaction products of the toluene diisocyanates, 4,4'-diisocyanatodiphenylmethane, hexamethylene diisocyanate, and 4,4'-diisocyanatodicyclohexylmethane represent the most important applications of the process due to the commercial importance of these diisocyanates at present. Obviously, new developments in the isocyanate field may change this situation.

Isocyanate reaction products may be divided conveniently into two major classes; namely, products formed by the reaction of the isocyanato group with active hydrogen compounds and products formed by addition or condensation polymerization reactions of the isocyanato group.

Representative examples of the first class of products include ureas, which can be prepared by reacting isocyanates with ammonia, primary amines and secondary amines or prepared by reacting many isocyanates with water; urethanes, which can be prepared from isocyanates and alcohols or phenols; amides, prepared by reacting aliphatic or aromatic carboxylic acids with isocyanates, accompanied by the loss of carbon dioxide; biurets, from isocyanates and ureas; and allophanates, from isocyanates and urethanes. This list is not meant to restrict the reaction products of isocyanates with active hydrogen compounds, but it does include the most important examples of this class. This class of compounds includes any isocyanate reaction product derived from an active hydrogen compound, or in other words, any compound which gives a positive Zerewitinoff test. The compounds in this class may be characterized by the presence of the

structural unit.

This class of reaction products includes most of the materials which are likely to be subjected to hydrolysis by the present process on a commercial scale. Thus, phosgenation tars, which consist mainly of ureas or polymeric ureas and possibly smaller amounts of biuret, trimer, and carbodiimide are included. Likewise, polyurethane plastics, elastomers and foams; and polyurea and polyamide fibers or plastics are included.

The second class of reaction products that can be hydrolyzed by the process of the present invention includes the isocyanate dimers, isocyanate trimers (isocyanurates) and carbodiimides. These compounds are made from isocyanates by reactions involving polymerization of the isocyanato group. Examples of these types of compounds are well-known in the aromatic series. Aliphatic isocyanate dimers have never been reported in the literature, but aliphatic isocyanate trimers and carbodiimides are known. While the process of the present invention may find little commercial application to the isocyanate reaction products of this class at present, it is nevertheless capable of hydrolyzing even the isocyanate trimers which are known for their great stability toward hydrolysis and other reactions. The isocyanate dimers and trimers contain the structural unit

where R represents the radical to which the isocyanato group was originally attached. Carbodiimides have the structure R—N=C=N—R where R has the meaning above.

As previously mentioned, hydrolysis of polyisocyanate reaction products to produce polyamines is accomplished in the novel process of this invention by contacting the polyisocyanate reaction products with superheated steam at temperatures in the range of 200–400° C. Superheated steam may be described as water vapor above its equilibrium condensation point. Superheated steam does not contain any condensed water nor can it exist in the presence of a separate condensed water phase. Water vapor can be at equilibrium with liquid or condensed water at temperatures ranging from 200–374.2° C. if pressures ranging from about 15–218 atmospheres are employed. While hydrolysis can be carried out at such high pressures, it is one aim of this invention to avoid the need for expensive heavily-constructed processing equipment. Thus, it is preferred to operate the present process at pressures ranging from about 1–5 atmospheres. Surprisingly, liquid water is not required to bring about hydrolysis under the conditions of the process.

In practicing the process of this invention, it is usually desirable to employ a considerable excess of steam over that required by theory to effect hydrolysis. When a large excess of steam is employed, the hydrolysis reaction will usually proceed more rapidly as a result of good physical contact of the steam with the material being hydrolyzed. Furthermore, it is often desirable to strip away the polyamine almost as rapidly as it is formed by hydrolysis. This prevents excessive exposure of the polyamine to the relatively severe temperature conditions which exist in the hydrolysis zone. Many of the polyamines which can be obtained by this process do not steam distill readily and a large quantity of steam is required for their removal.

It has been found practical to use about 2–10 lbs. of superheated steam/lb. of polyamine to be produced. Smaller quantities of steam can be used, but the rate of hydrolysis may be reduced. Greater quantities of steam are generally not required except in the case of very high boiling polyamines and then only when it is desirable to remove the polyamine from the hydrolysis zone by steam stripping. In the case of the by-product tars or residues resulting from the phosgenation of m-tolylenediamines, about 5–8 lbs. of steam/lb. of recovered diamine is preferred.

As previously mentioned, the process of the present invention requires that the material being hydrolyzed be essentially non-volatile under the conditions employed. A further restriction with regard to the material being hydrolyzed is that it not form a volatile intermediate product short of the desired amine. These restrictions are necessary because polyisocyanate reaction products which are volatile under the conditions employed in this process will be carried away from the hydrolysis zone by the passage of superheated steam before hydrolysis can proceed to essential completion.

Difficulty in meeting these requirements has been encountered with reaction products derived from monoisocyanates. For example, if N,N'-diphenylurea is treated with superheated steam at 300° C., it will be found that most of the urea distills with the steam unchanged. It is true that a trace of aniline is formed before all of the diphenylurea has been distilled away, but the process is not practical for recovering aniline from this material. By reducing the amount of steam used, a greater amount of the diphenylurea can be hydrolyzed before it is carried away by the superheated steam, but other difficulties such as insuring proper contact of the steam with the diphenylurea again limit the usefulness of this process as a means for hydrolyzing diphenylurea. Even the non-volatile urethane prepared by reacting two moles of phenyl isocyanate with one mole of polytetramethylene ether glycol of about 1000 molecular weight cannot be effectively hydrolyzed to aniline because this urethane when exposed to superheated steam at temperatures of about 300° C. is changed back to the free glycol and N,N′-diphenylurea. The diphenylurea is removed from the system by steam-distillation almost as rapidly as it is formed by hydrolysis of the original urethane. As in the case of treating diphenylurea itself with steam, a small trace of aniline is again formed, but the urea leaves the hydrolysis zone before any appreciable quantity of aniline has been produced. As previously stated, these difficulties have only been experienced with mono-isocyanates. The isocyanate reaction products derived from polyisocyanates are sufficiently non-volatile that hydrolysis can be completed readily before an appreciable quantity of the polyisocyanate reaction product has co-distilled from the hydrolysis zone with the superheated steam.

Superheated steam at temperatures ranging from about 200–400° C. is used to effect hydrolysis of the polyisocyanate reaction products in this process. While the hydrolysis of most polyisocyanate reaction products will start at 200° C., the rate of the hydrolysis reaction can be increased significantly by operating at higher temperatures of the order of 250–350° C. By operation in this latter temperature range, hydrolysis reactions can be essentially completed in contact times ranging from about 2–8 hours. While hydrolysis proceeds at temperatures down to 200° C. and even lower, the times required to produce practical results will be quite extended. With materials that are particularly difficult to hydrolyze, such as the aromatic diisocyanate trimers, temperatures approaching the upper limit of 400° C. may be desirable. Temperatures above 400° C. may be used, but above this point, thermal decomposition reactions which produce by-product tars may reduce the quantity of polyamine obtained.

With most polyisocyanate reaction products, the progress of the hydrolysis may be followed by measuring the rate at which carbon dioxide is evolved. This is relatively easy to estimate, because the vapors leaving the hydrolysis zone consist largely of steam, polyamine and carbon dioxide, from which the steam and polyamine may be readily condensed and the volume of carbon dioxide gas measured with a wet test meter. In the case of those isocyanate reaction products which do not evolve carbon dioxide during hydrolysis, such as amides, the progress of the reaction may be followed by determining the quantity of amine in a sample of condensed vapors or in a sample of the mass taken from the hydrolysis zone. Determination of the amine present in these samples may be accomplished in a variety of ways including titration with sodium nitrite, gas chromatography, infrared or ultraviolet spectrography, and polarography.

The hydrolysis process of the present invention may be carried out in a variety of ways. In the case of infusible polyisocyanate reaction products in the particulate form of powder or small granules, the hydrolysis can be performed by the passage of steam through the particles contained in a column. If the rate of steam flow is properly adjusted, infusible powders or small granules can be fluidized. It is well known that contact between gases and solids is excellent with such a procedure. In employing an arrangement of this type, it is usually desirable to remove the product polyamine about as rapidly as it is formed. If the polyamine is not removed, there is danger that it will wet the infusible powder and cause sticking or caking and interfere with further hydrolysis.

When employing this procedure, it is also desirable to heat the isocyanate reaction product to a temperature over 100° C. prior to the introduction of steam to prevent wetting the particles with steam condensate which might cause caking. This heat may be furnished by introducing a hot inert gas stream or by heaters surrounding the column.

In the case of liquid polyisocyanate reaction products, hydrolysis may be performed in an agitated vessel containing the polyisocyanate reaction product by introducing steam underneath the surface of the liquid.

While either of the above procedures are of use in specialized cases, there is a preferred procedure which has more general applicability. The preferred procedure for treating polyisocyanate reaction products with superheated steam comprises suspending them in an inert high-boiling fluid and passing superheated steam through the suspension. Contact between the steam and the suspension of polyisocyanate reaction product can be effected in a variety of conventional types of equipment including columns, towers, pipe line reactors and agitated vessels.

The process may be operated both batchwise or continuously, but is conveniently performed batchwise in agitated vessels. These vessels may be heated entirely by means of superheated steam or auxiliary heat may be furnished to maintain the reaction zone in the proper temperature range. The passage of superheated steam may be started at any temperature, but it is preferable to heat the suspending medium and isocyanate reaction product to temperatures about 100° C. to prevent the condensation of water in the reaction medium and to reduce the amount of steam required for the hydrolysis.

While any liquid which is essentially non-volatile and inert may be used to suspend the isocyanate reaction products, the naphthenic hydrocarbon oils recommended as a medium for the process of U.S. Patent 2,889,257 are especially preferred. These refined oils, of the nature of a lubricating oil bright stock, consist essentially of carbocyclic ring structures having paraffinic side chains. The majority of carbocyclic rings are saturated, but a small portion may be aromatic in nature. The percent of aromatic rings present may range up to about 10% of the total hydrocarbon composition. These refined oils are quite non-volatile and have good thermal stability under the conditions employed in the present process. These oils are poor solvents for polyisocyanate reaction products but polyisocyanate reaction products can be readily dispersed in these oils especially in the presence of suitable surface active agents which will be described later.

The suspension in naphthenic oil method of carrying out the hydrolysis of the present invention is very convenient for recovering m-tolylenediamines from the by-product tars or solid residues resulting from the phosgenation of m-tolylenediamines. It is especially effective for recovering m-tolylenediamine from the solid residues which are produced by the process of U.S. 2,889,257. Since the solid residues produced by the process of U.S. 2,889,257 are already suspended in the naphthenic hydrocarbon oils described above, treatment with steam may be carried out directly, or the concentration of solid phosgenation residue in oil may first be increased by partial filtration or thickening followed by treatment with superheated steam.

The surface active agents which find use in suspending polyisocyanate reaction products in the naphthenic hydrocarbon oils described above are described in U.S. Patent 2,810,681. They are normally used in lubricating or fuel oils to reduce sludge formation and to disperse any solids which form or are already present. In the present invention, these surfactants appear to act in a similar manner by dispersing and preventing the agglomeration of the polyisocyanate reaction product during hydrolysis. These surfactants are preferably addition type copolymers containing in combined form as their essential monomeric components, (a) copolymerizable ethylenically unsaturated compounds which contain only one polymerizable ethylenic linkage, at least one of which components is amine-free and contains from 8 to 18 carbon atoms in an aliphatic hydrocarbon chain, which in the polymer is not part of the main chain, and (b) a compound containing a basic amino-nitrogen in the side chain, the said copolymer containing 0.1% to 3.0% by weight of basic amino-nitrogen.

The type of amine-free components employed in the preparation of these copolymers includes the long chain alkyl methacrylates such as lauryl methacrylate, tridecyl methacrylate, octadecyl methacrylate, n-octyl methacrylate, 2-hexylethyl methacrylate, sec.-capryl methacrylate, n-decyl acrylate, and such compounds as vinyl laurate, ar-dodecyl styrene, laurylethyl maleate, lauryl fumarate, dodecylhexyl styrene, of the types more particularly described in U.S. Patents 2,666,044, 2,737,496 and 2,737,452.

The second component of the copolymer which contains the basic nitrogen in the side chain may be exemplified by such compounds as beta-diethylaminoethyl methacrylate, paradiethylaminoethyl styrene, 2-methyl-5-vinyl pyridine, 4-vinyl-pyridine, 4-dimethylaminocyclohexyl methacrylate, beta-dicyclohexylaminoethyl methacrylate, diallylamine, and any other basic amino-nitrogen compound including primary, secondary and tertiary amines as more particularly exemplified in the patents above mentioned. As illustrated in these patents, the basic amino-nitrogen containing component that imparts sludge-inhibiting and dispersing properties to the polymers useful in this invention can be introduced through the use of appropriate copolymerizable monomers containing primary, secondary, and tertiary amino-nitrogen that is attached ultimately to the chain of the polymer as part of an extralinear substituent group in which the nitrogen is joined extranuclearly only to non-benzenoid carbon atoms. Attachment of the amino groups to the main copolymer carbon chain can be through strictly hydrocarbon structures or through ether, ester, or amide linkages.

As disclosed in the patents above mentioned which more particularly describe surfactants employed in the present invention, the amount of first and second component employed will of course be that required to give in the final polymer a basic nitrogen content of 0.1% to 3.0% of the total weight of the polymer. Usually from 75% to 95% of the long chain methacrylates with from 5% to 25% of the basic nitrogen-containing monomer will give the desired products.

These surfactants may also contain additional copolymerizable components which may be added to the polymer to maintain the basic nitrogen content within the range specified above, as more particularly illustrated in U.S. Patents 2,666,044 and 2,737,496.

The preferred surfactant of the present invention is a 90:10 parts by weight copolymer of technical lauryl methacrylate and beta-diethylaminoethyl methacrylate, but any of the surfactants disclosed above may be used to advantage. When the surfactant is employed in the present process, it should be used in amounts equal to about 0.1–3.0% based on the weight of naphthenic hydrocarbon oil. The addition of about 0.3–0.5 part of surfactant to naphthenic oil has been found to be adequate to maintain phosgenation residues well dispersed throughout the course of the hydrolysis reaction.

In recovering amines from polyurethanes which in turn have been derived from isocyanates and high molecular weight polyalkyleneether polyols, hydrolysis may be conveniently carried out by suspending the polyisocyanate reaction product in a portion of the polyalkyleneether polyol contained in the polyurethane rather than the naphthenic oil described above. If sufficient steam is used to remove the polyamine, the polyalkyleneether glycol portion of the polyurethane will remain in the hydrolysis zone along witht he polyol which was present at the start of the hydrolysis. A portion of the polyalkyleneether polyol in the hydrolysis vessel can be drawn off and a new charge of polyurethane material added and the passage of steam repeated to produce additional polyamine and polyalkyleneether polyol. Since most polyalkyleneether polyols are temperature stable and resistant to hydrolysis, temperatures in the range of 300–350° C. may be employed. In carrying out this modification of the process, the use of surfactants is not required.

In the case of polyureas, polyurethanes and polyamides which are derived at least partially from low molecular weight glycols, polyols, amines, and carboxylic acids, polyamines produced by the process of the present invention will be accompanied by these low molecular weight intermediates. For example, if a polyurethane prepared from hexamethylene diisocyanate and 1,4-butanediol is subjected to steam hydrolysis, both hexamethylenediamine and butanediol will be stripped from the hydrolysis zone and when condensed will be present as a mixture. In most cases, this is not a disadvantage since the materials usually can be separated easily by fractional distillation, and it may be of advantage economically since both of the materials recovered may be of value. Naturally, if the reaction products involved are prepared by reactions involving more than one polyisocyanate, a mixture of polyamines will be recovered in the present invention. It should be pointed out that polyurethanes derived from polyisocyanates and polyester glycols are subject to hydrolysis of the polyester linkages of the polymer as well as the linkages derived by reaction of the isocyanato groups. The value of the process of this invention in recovering polyamines from polyurethanes containing polyester portions depends to a certain extent on the materials from which the polyester glycol or polyol was derived originally.

When the process of the present invention is operated with sufficient superheated steam to remove polyamine about as rapidly as it is formed, the polyamine may be isolated by condensing water and polyamine vapors leaving the hydrolysis zone and distilling to separate water and polyamine from any non-volatile materials which may have been entrained during the passage of steam. Partial condensation of the vapors from the hydrolysis zone may often be used to advantage if the polyamine is sufficiently high boiling and has little tendency to steam distill. When the quantity of steam employed to effect hydrolysis is not sufficient to remove the polyamine from the hydrolysis zone, the polyamine can be isolated by conventional means such as distillation or extraction.

Certain polyisocyanate reaction products which may be subjected to hydrolysis by the process of the present invention may contain free polyisocyanates. This is particularly true of such materials as phosgenation residues, since removal of the last traces of polyisocyanate may be very difficult. If superheated steam is passed directly through a polyisocyanate reaction product containing a free polyisocyanate, a portion of the polyisocyanate will often steam distill away from the hydrolysis zone unchanged and be converted to urea at some point in the equipment beyond the hydrolysis zone. Since polymeric ureas are quite high melting and non-volatile they may form solids throughout the equipment beyond the hydrolysis zone which may eventually plug the equipment or interfere with the operation of the process. This problem can be avoided if polyisocyanate reaction products containing some free polyisocyanate are first contacted with water at a temperature near about 100° C. This treatment permits the polyisocyanate to be converted to polyureas which are relatively non-volatile compared to the free polyisocyanate. Treatment at this point is not limited to the use of water, and other active hydrogen-containing materials such as ammonia, alcohols, amines and hydrogen sulfide may be used to react with the free polyisocyanate before the passage of superheated steam is initiated.

The examples which follow are representative of the manner in which the process of the present invention can be conducted and of the materials employed so as to ob-

9 tain polyamines from polyisocyanate reaction products. Parts and percents are by weight unless otherwise indicated.

Example 1

Powered toluene diisocyanate phosgenation residue produced by the process of U.S. Patent 2,810,681 is washed well with petroleum ether to remove the naphthenic hydrocarbon oil used in producing the phosgenation residue. The washed phosgenation residue is air-dried to remove most of the petroleum ether and placed in an oven at 70° C. to complete the removal of solvent. The dry phosgenation residue is placed in a column which is equipped for heating and has provision for the introduction of steam at the bottom. The column is connected at its upper end to a downward water-cooled condenser, so that steam and condensable vapors passing up the column may be collected by condensation. The column and the phosgenation residue contained in it are heated to over 100° C. Sufficient steam superheated to a temperature of about 200° C., is introduced to fluidize the bed of dry phosgenation residue is 101° C. Due to the temperature of temperature of the vapors above the fluidized bed of phosgentaion residue is 101° C. Due to the temperature of the superheated steam, plus the heat introduced by the column heaters, the temperature of the vapors above the fluidized bed rises to about 240° C. in about ½ hr. Once the temperature has reached 240° C., the passage of superheated steam is continued for a period of about 4 hours, during which time, the temperature of the vapor over the fluidized bed ranges from about 240–245° C. The quantity of steam employed is such that its velocity in the column is about 6 cm./sec. During the passage of steam, the vapors leaving the column, which comprise water, m-tolylenediamine and carbon dioxide are passed through the water-cooled condenser connected to the column. Two hundred parts of condensate is obtained for every one hundred parts of residue initially charged to the column. The condensate is analyzed for m-tolylenediamine by means of a polarographic analysis, standardized with pure m-tolylenediamine. The solution is found to contain a quantity of amine equivalent to about 7 parts of m-tolylenediamine for each 100 parts of the phosgenation residue initially charged.

Example 2

About 400 parts of a naphthenic hydrocarbon oil having a Saybolt Universal viscosity of 150 seconds at 210° F. is placed in a heated vessel equipped with an agitator and a condenser leading to a receiver. The vessel is also equipped with an inlet placed near its bottom for the introduction of superheated steam. About 150 parts of dry powdered phosgenation residue prepared as described in Example 1, is introduced into the oil. The slurry of phosgenation residue in oil is agitated and heat is supplied to the vessel. When the temperature of the slurry reaches 190° C., the flow of superheated steam through the slurry is started. The temperature of the superheated steam ranges from about 350° C.–370° C. The passage of steam is continued for a period of two hours at a rate of about 200 parts/hr., during which time the temperatures of the slurry increases from 190° C. to 250° C. All condensable vapors are collected by means of the condenser which is water-cooled. Essentially all of the carbon dioxide evolved as a result of hydrolysis passes through the condensation system to the atmosphere. A total of about 407 parts of distillate is collected and analysis of this condensate by polarographic assay shows the presence of 31.9 parts of m-tolylenediamine. This is equivalent to 21.2 parts of m-tolylenediamine per 100 parts of phosgenation residue.

Following the passage of steam, the reaction vessel is opened and examined. It is found to contain some small lumps of material above the surface of the oil. The lumps have the appearance of an expanded or gas-blown plastic mass.

10

Example 3

Hydrolysis is repeated as in Example 2, with the exception that 8 parts of a 90:10 copolymer of technical lauryl methacrylate and beta-diethylaminoethyl methacrylate is added to the 400 parts of naphthenic hydrocarbon oil prior to the passage of steam. Polarographic analysis of the condensate produced in this run shows that 31.7 parts of m-tolylenediamine is produced per 100 parts of dry phosgenation residue.

The reaction vessel is again opened for inspection. The walls of the vessel are free of material above the oil level and no lumps of the type found following the run in Example 2 are present. The non-hydrolyzable solids remaining in the oil are dispersed uniformly.

Example 4

About 2020 parts of the naphthenic hydrocarbon oil used in Example 2 is placed in a heated vessel equipped with an agitator, condenser, and steam inlet. About 15 parts of a 90:10 copolymer of technical lauryl methacrylate and beta-diethylaminoethyl methacrylate is added to the oil. Agitation is started in the vessel and 960 parts of a tarry distillation residue, resulting from the preparation of 4:1 mixture (parts by weight) of toluene-2,4- and of toluene-2,6-diisocyanate, respectively, by phosgenation of mixed m-tolylenediamine isomers, is added at room temperature. The distillation residue contains 32.4% toluene diisocyanate and 67.6% non-volatile phosgenation by-products.

Rather than attempt hydrolysis directly, the slurry of distillation residue containing free toluene diisocyanate is first treated with water in the following way to convert free toluene diisocyanate into polymeric ureas. The contents of the vessel are heated to 100° C. and 3 parts of triethylenediamine is added. About 350 parts of a 2% solution of hydrogen peroxide in water is then added over a period of about 1 hour. The triethylenediamine and hydrogen peroxide are added to catalyze the reaction of water with the toluene diisocyanate. The mixture is refluxed for about 2 hours, after which time the evolution of carbon dioxide ceases indicating completion of the reaction between water and toluene diisocyanate. The water remaining in the vessel is then distilled and the temperature of the dry oil slurry is increased to about 260° C. at which point, superheated steam at a temperature of about 315° C. is introduced. The passage of superheated steam is continued for a period of 8 hours, during which the temperature of the oil in the hydrolysis vessel ranges from 310–335° C. Steam is introduced at a rate of about 300 parts per hour during this period. The condensate obtained consists of two layers; an aqueous layer containing m-tolylenediamine and a small layer of steam distilled naphthenic hydrocarbon oil. The oil layer is separated from the aqueous phase and may be returned to the hydrolysis vessel for reuse.

Water is then removed from the aqueous layer by distillation at atmospheric pressure. The m-tolylenediamine remaining after the removal of water, is distilled under vacuum at about 10 mm. Hg abs. pressure. About 419 parts of distilled m-tolylene-diamine is recovered and the essentially non-volatile residue remaining after distillation of the diamine amounts to 19 parts. If it is assumed that the toluene diisocyanate initially present in the tar is converted in theoretical amount to m-tolylenediamine, the yield of m-tolylenediamine from the phosgenation residue portion of the initial tar sample amounts to 35.5 parts of diamine/100 parts of phosgenation residue.

Example 5

About 1508 parts of naphthenic hydrocarbon oil as used in Example 2, and 15 parts of a 90:10 copolymer of technical lauryl methacrylate and beta-diethylaminoethyl methacrylate are placed in an agitated vessel as described in Example 2. About 500 parts of crude 4,4'-diisocyanatodiphenylmethane is added to the oil with agitation at about 30° C. The crude 4,4'-diisocyanato-diphenylmethane is about 85% pure, the remainder being phosgenation tars. The temperature of this mass is raised to 100° C. and 2 parts of triethylenediamine is added, followed by about 200 parts of water. The 4,4'-diisocyanatodiphenylmethane is reacted with the water by refluxing at a temperature of about 100–110° C. for one hour. The excess water over that required to convert the diisocyanate to polymeric ureas is removed by distillation at atmospheric pressure and the temperature of the oil in the vessel is raised to about 200° C. Superheated steam at about 315° C. is introduced at a rate of 250 parts/hour for a period of 4 hours while the temperature of the oil in the vessel is maintained at 320–360° C. 4,4'-methylenedianiline is recovered from the condensate of this run by distillation. The 4,4'-methylenedianiline distills at about 220–235° C. at 1 mm. Hg absolute pressure. About 111 parts of the diamine is obtained. The diamine has a freezing point of 84.7° C. and exhibits an infrared absorption spectra of a known sample of 4,4'-methylenedianiline.

*Example 6*

A solid polymeric urea is prepared by reacting 920 parts of toluene diisocyanate (having a composition corresponding to 80 parts of toluene-2,4-diisocyanate and 20 parts toluene-2,6-diisocyanate) with about 200 parts of water in the presence of 1467 parts of naphthenic hydrocarbon oil as specified in Example 2 and two parts of triethylenediamine. The reaction of the diisocyanate with water is conducted at about 100° C. under reflux. When the toluene diisocyanate has been completely converted to polymeric ureas as indicated by a cessation of the evolution of the carbon dioxide, excess water is removed by distillation at atmospheric pressure. The slurry of polymeric ureas in oil is placed in a reaction vessel as described in Example 2. The slurry is heated to about 200° C. and the passage of superheated steam at about 315° C. is initiated. Hydrolysis is continued at temperatures ranging from 300–340° C. for a period of 12 hours with a steam flow of about 250 parts/hr. The condensate consists of an aqueous layer containing m-tolylenediamine and an oil layer. The oil layer is separated and saved for reuse. Water is removed from the aqueous layer by atmospheric distillation and the crude m-tolylenediamine remaining is recovered by distillation under vacuum. A total of 563 parts of distilled diamine is recovered which corresponds to 87.3% of the theoretical amount obtainable based on the starting toluene diisocyanate used for the preparation of the polymeric ureas.

*Example 7*

A polymeric urea is prepared from hexamethylene diisocyanate by reacting 352 parts of hexamethylene diisocyanate dissolved in 1892 parts of ethyl acetate with an excess of 109 parts of water in the presence of 5 parts of triethylenediamine and 30 parts of 3% hydrogen peroxide in water. The reaction is carried out by adding the water to the solution of hexamethylene diisocyanate in an agitated vessel equipped with a reflux condenser. The water is added over a period of about 1 hour at 77° C., at the end of which time the reaction is completed as evidenced by no further evolution of carbon dioxide. The slurry of polymeric ureas in ethyl acetate is agitated for 16 hours, filtered and washed with petroleum ether. The solid cake is dried in the air.

The polymeric urea produced in this fashion is charged into about 1500 parts of naphthenic hydrocarbon oil, described in Example 2, containing 20 parts of a 90:10 copolymer of technical lauryl methacrylate and beta-diethylaminoethyl methacrylate. The slurry of polymeric ureas in oil is heated to a temperature of about 200° C. and the flow of superheated steam through the slurry is initiated. Over a period of about 1 hour, the temperature is increased from 200–300° C. Passage of superheated steam at about 315° C. is continued for an additional 2 hours at a rate of 200 parts/hr. Temperature in the hydrolysis zone ranges from about 300–330° C. Water is removed from the condensate obtained by distillation at atmospheric pressure. The residue remaining after the atmospheric distillation is distilled under vacuum. About 183 parts of distilled hexamethylene diamine is obtained in this fashion. This corresponds to a theoretical yield of 75.6% based on the hexamethylene diisocyanate initially used. The infrared absorption spectra of the recovered hexamethylene diamine is identical to that of an authentic sample of hexamethylene diamine.

*Example 8*

Two hundred and fifty parts of toluene-2,4-diisocyanate, dissolved in 1200 parts of dry o-dichlorobenzene, is trimerized by the addition of 25 parts of diethylamine and 5 parts of p-dimethylaminomethylphenol. The solution is stirred for about 30 minutes at room temperature after which solids appear and the reaction mass becomes almost solid. A small portion of the solids is washed with petroleum ether, dried in a vacuum oven at 100° C. and examined by infrared analysis. The solids exhibit strong absorption at 5.85 Angstrom units which is recognized as the trimer absorption wave length.

The slurry of trimer in o-dichlorobenzene is transferred to a hydrolysis vessel as described in Example 2 containing 1500 parts of naphthenic hydrocarbon oil and 20 parts of a 90:10 copolymer of technical lauryl methacrylate and beta-diethylaminoethyl methacrylate. First the o-dichlorobenzene is removed by distillation at atmospheric pressure. When the temperature of the oil containing the trimer reaches about 200° C., flow of superheated steam at about 315° C. through the slurry is initiated. The flow of steam is continued at a rate of about 250 parts/hr. while maintaining the temperature of the oil slurry at about 330–365° C. for about 4 hours. The condensate obtained consists of two layers, a large aqueous layer containing m-tolylenediamine and a small layer of steam-distilled naphthenic hydrocarbon oil. The naphthenic hydrocarbon oil layer is separated and the aqueous layer is distilled. About 174 parts of distilled m-tolylenediamine is obtained. This corresponds to a yield of 81.5% of theory.

As many apparently widely different embodiments of this invention may be made without departing from the spirit and scope thereof, it is to be understood that this invention is not limited to the specific embodiments thereof except as defined in the appended claims.

What is claimed is:

1. A process for obtaining a polyamine which comprises hydrolyzing in the absence of condensed water a phosgenation tar with steam superheated to a temperature between 200–400° C.

2. The process of claim 1 wherein said polyamine is distilled with said steam and is subsequently separated therefrom.

3. The process of claim 1 wherein said phosgenation tar is heated to at least 100° C. before contacting with steam.

4. The process of claim 1 wherein said phosgenation tar is freed of unreacted polyisocyanate prior to contacting with superheated steam.

5. The process of claim 1 wherein said phosgenation tar is produced by the phosgenation of a polyamine selected from the group consisting of m-tolylenediamine, 4,4'-diaminodiphenylmethane, hexamethylene diamine, and 4,4'-diaminodicyclohexylmethane.

6. The process of claim 1 wherein the hydrolyzing step is carried out under a pressure of 1 to 5 atmospheres.

7. The process of claim 1 wherein from 2 to 10 lbs. of said steam is present for each pound of said polyamine being produced.

8. A process for obtaining a polyamine which comprises dispersing a phosgenation tar in an inert organic liquid and thereafter hydrolyzing in the absence of condensed water the resulting dispersed phosgenation tar with steam superheated to a temperature between 200–400° C.

9. The process of claim 8 wherein said inert organic liquid is heated to at least 100° C. before hydrolyzing said dipsersed phosgenation tar with said steam.

10. The process of claim 8 wherein said phosgenation tar is freed of unreacted polyisocyanate prior to contacting with superheated steam.

11. The process of claim 8 wherein said inert organic liquid is naphthenic hydrocarbon oil.

12. The process of claim 8 wherein said inert organic liquid is naphthenic hydrocarbon oil and said phosgenation tar is dispersed therein by a surface active agent consisting of a copolymer consisting of, in relative amounts by weight, 90 parts of technical lauryl methacrylate and 10 parts of beta-diethyl-aminoethyl-methacrylate.

References Cited by the Examiner
FOREIGN PATENTS

| | | |
|---|---|---|
| 926,211 | 4/1946 | France. |
| 951,268 | 10/1956 | Germany. |
| 790,503 | 2/1958 | Great Britain. |
| 795,639 | 5/1958 | Great Britain. |

OTHER REFERENCES

Migrdichian: "Organic Synthesis," vol. I, p. 398 (1957).

Theilheimer: "Synthetic Methods of Organic Chemistry," vol. 11, p. 219, paragraph 513 (1957).

CHARLES B. PARKER, *Primary Examiner.*

IRVING MARCUS, *Examiner.*